United States Patent [19]

King et al.

[11] 4,332,864
[45] Jun. 1, 1982

[54] PRIMARY ELECTRIC CELL HAVING MAGNESIUM ALLOY ANODE

[75] Inventors: John F. King, Bury, Lancs.; Stephen L. Bradshaw, Bolton, Lancs., both of England

[73] Assignee: Magnesium Elektron Limited, Great Britain

[21] Appl. No.: 188,152

[22] Filed: Sep. 17, 1980

[30] Foreign Application Priority Data

Sep. 19, 1979 [GB] United Kingdom ............... 7932401

[51] Int. Cl.³ .................. H01M 6/34; H01M 4/38
[52] U.S. Cl. ....................................... 429/3; 429/119; 429/218; 420/407; 420/408; 420/410
[58] Field of Search ............... 429/119, 3, 218, 219, 429/224; 75/168 R, 168 B, 168 C, 168 M; 252/182.1

[56] References Cited

U.S. PATENT DOCUMENTS

| | | | |
|---|---|---|---|
| 1,905,445 | 4/1933 | Ridder et al. | 75/168 C |
| 1,942,041 | 1/1934 | Wood | 75/168 B |
| 1,957,934 | 5/1934 | Brooks | 75/168 R |
| 3,189,486 | 6/1965 | Pryor et al. | 429/119 X |
| 3,228,800 | 1/1966 | Kirk | 429/119 X |
| 3,243,765 | 3/1966 | Suleski | 429/119 X |
| 3,288,649 | 11/1966 | McCallum | 429/119 X |
| 3,317,350 | 5/1967 | Murphy | 429/119 |
| 3,653,880 | 4/1972 | Gitlesen | 75/168 R |

Primary Examiner—Anthony Skapars
Attorney, Agent, or Firm—Karl W. Flocks; Sheridan Neimark

[57] ABSTRACT

A magnesium alloy contains the following additives: Al 1-9%, Zn 0-4%, Sn 0.1-5%, Mn 0-1%. It is useful as an anode in cells operating with a salt water electrolyte, especially in batteries powering equipment for deep-sea use in which a pulsed power source is required.

7 Claims, 3 Drawing Figures

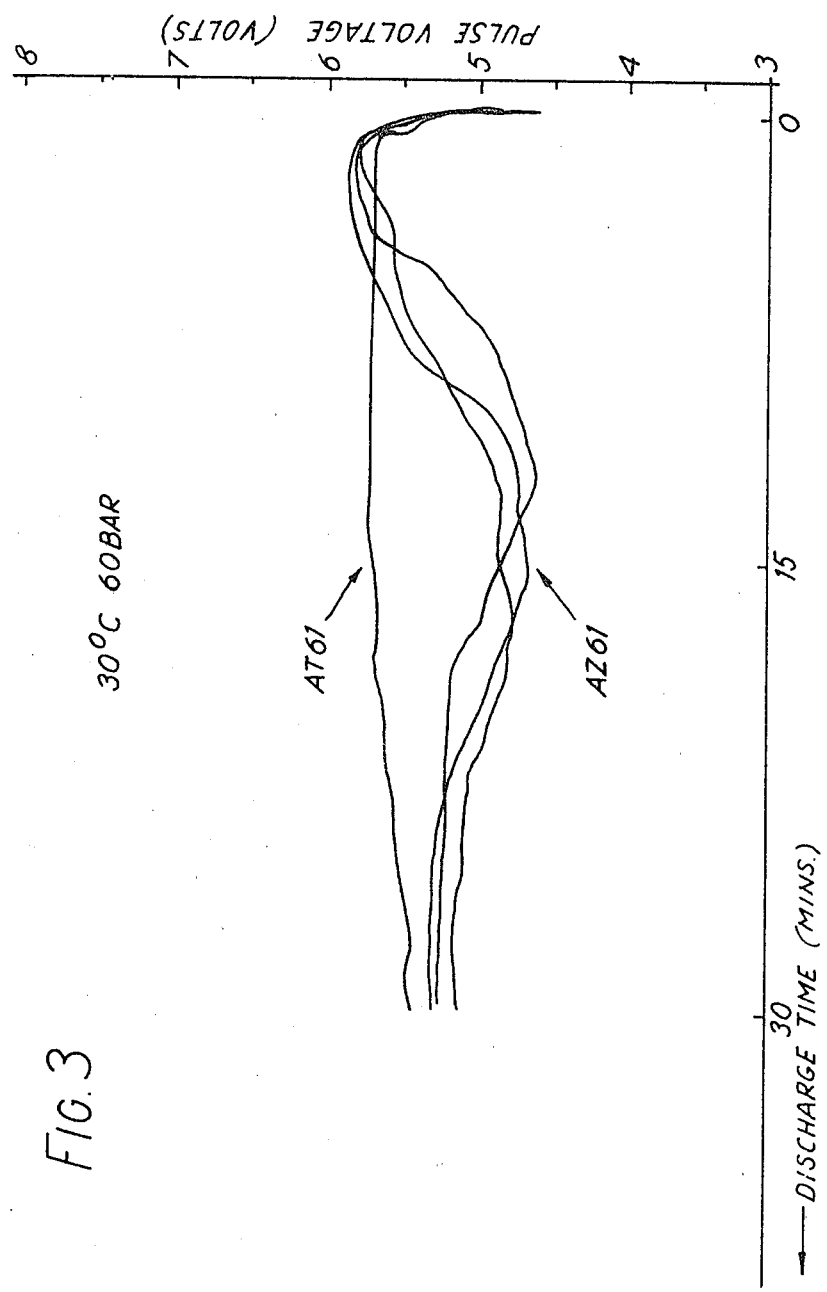

PRIMARY ELECTRIC CELL HAVING MAGNESIUM ALLOY ANODE

This invention relates to magnesium alloys and their use in electric cells.

Magnesium alloys are commonly used as the anode material in primary cells using salt water as the electrolyte: such cells find various applications to provide an underwater electric current supply for use at sea. It is desirable to provide reliable cells which use sea-water as the electrolyte and which are capable of operating reliably under widely differing discharge conditions (e.g. at low and high currents, continuous or intermittent discharge) at different temperatures and at the considerable pressures encountered in deep-water use.

Known cells of this type normally use a cathode material such as silver chloride or lead chloride and the anode may be a magnesium alloy containing minor quantities of zinc, aluminium, lead or thallium. Cells of this kind are described in United Kingdom Pat. No. 1,251,233 and U.S. Pat. No. 3,288,649.

A troublesome effect which appears during discharge of such cells is that of "sludging", i.e. the formation of a solid deposit in the spaces between anode and cathode in which the electrolyte is located. Sludge interferes with the electrical behaviour of the cell, reducing the voltage delivered and reducing the coulombic efficiency of the cell. The nature of this deposit may vary from a fine, loose powder which accumulates mostly on the magnesium alloy plate and has only a small effect on the cell to a spongy film which may fill the gap between the plates completely. In the latter case the effectiveness of the cell is grossly impaired.

It has been found that the tendency to form sludge increases as the temperature and pressure increase.

It has also been found that the voltage delivered by the cells may be adversely affected by polarisation effects, even when severe build up of sludge is not visually evident. This is found for example in batteries subjected to pulse loading, such as in sonobuoys, where a high current drain is superimposed on a constant low current drain (e.g. for 1 second every 10 seconds). When discharged at high hydrostatic pressure, the voltage obtained on pulsing a battery of cells using an alloy such as AZ61 (containing in weight percent Mg-6% Al-1% Zn-0.20% Mn) may decay rapidly, although no visible evidence of thick sludge films is seen. An example of such deterioration for AZ61 is shown in FIG. 3 of the accompanying drawings.

In batteries which are pulse loaded as described above, the pulse of power is frequently required to activate equipment such as a sonar signal generator. In such cases it is essential that the pulses generated are of sufficient power to activate the equipment. It is sometimes found that after the cell or battery in the inactive state has been filled with seawater or operated only on low current drain for some time, initial pulses are of insufficient power, and a significant number of pulses are generated before the power has reached a level sufficient to activate the equipment. Performance of batteries in this respect deteriorate with increasing discharge time at low rates, and with increasing depth of operation (i.e. increasing pressure).

It has now been found that sludge formation in the cells may be reduced considerably by the use of magnesium alloys which contain minor amounts of tin. It has further been found that cells using these alloys show less tendency to voltage decay when discharged under pulsed load conditions and also give improved electrical performance over a wide range of pressures and mode of discharge.

It has been found that batteries using magnesium alloys containing additions of tin show faster response to changes in discharge current density, and that maximum power is achieved in significantly fewer pulses than with the alloys currently used, such as AZ61.

According to one aspect of the invention, there is provided a magnesium alloy containing the following constituents by weight (apart from normal impurities):

| | |
|---|---|
| Al | 1–9% |
| Zn | 0–4% |
| Sn | 0.1–5% |
| Mn | 0–1% |

Preferred alloys of this type contain the following constituents:

| | |
|---|---|
| Al | 4–7% |
| Zn | 0–1% |
| Sn | 0.25–3% |
| Mn | 0–0.3% |

An especially preferred alloy contains the following constituents by weight:

| | |
|---|---|
| Al | 5.5–6.5% |
| Zn | 0.5–1.0% |
| Sn | 0.5–1.5% |

The invention also relates to electric cells using such an alloy as the anode material, particularly of the type using a salt water electrolyte. The cathode material may be lead chloride or silver chloride.

Embodiments of the invention will be described by way of illustration in the following Examples. Reference is made to the accompanying drawings in which:

FIG. 3 shows the voltage obtained from a battery plotted against time.

Nine alloys having the compositions in weight percent given in Table 1 below were prepared by melting the pure constituents in graphite lined crucibles. The alloys were cast into plates 180 mm × 125 mm × 12.5 mm in a steel mould. The cast plates were homogenised at 400° C., machined to remove casting skin and then rolled from 400° C. to thickness in the range 0.28 mm–0.38 mm. After rolling, plates were solution heat treated for a minimum of 3 hours at 400° C., then rapidly cooled to room temperature to preserve a single phase metallurgical structure in the alloy.

TABLE 1

| Alloy | Al % | Zn % | Pb % | Tl % | Sn % | Mn % |
|---|---|---|---|---|---|---|
| AZ61 | 6.2 | 1.0 | — | — | — | 0.2 |
| AP65 | 6.2 | 1.0 | 4.5 | — | — | 0.2 |
| MTA75 | 5.0 | — | — | 7.0 | — | — |
| AT65 | 6.0 | — | — | — | 5.0 | — |
| AT62 | 6.0 | — | — | — | 2.0 | — |
| AT61 | 6.0 | — | — | — | 1.0 | — |

TABLE 1-continued

| Alloy | Al % | Zn % | Pb % | Tl % | Sn % | Mn % |
|---|---|---|---|---|---|---|
| ATM61¼ | 5.9 | — | — | — | 1.0 | 0.26 |
| ATZ611 | 6.1 | 0.6 | — | — | 1.0 | — |
| AT6½ | 5.9 | — | — | — | 0.4 | — |

EXAMPLE 1

Figure 1:
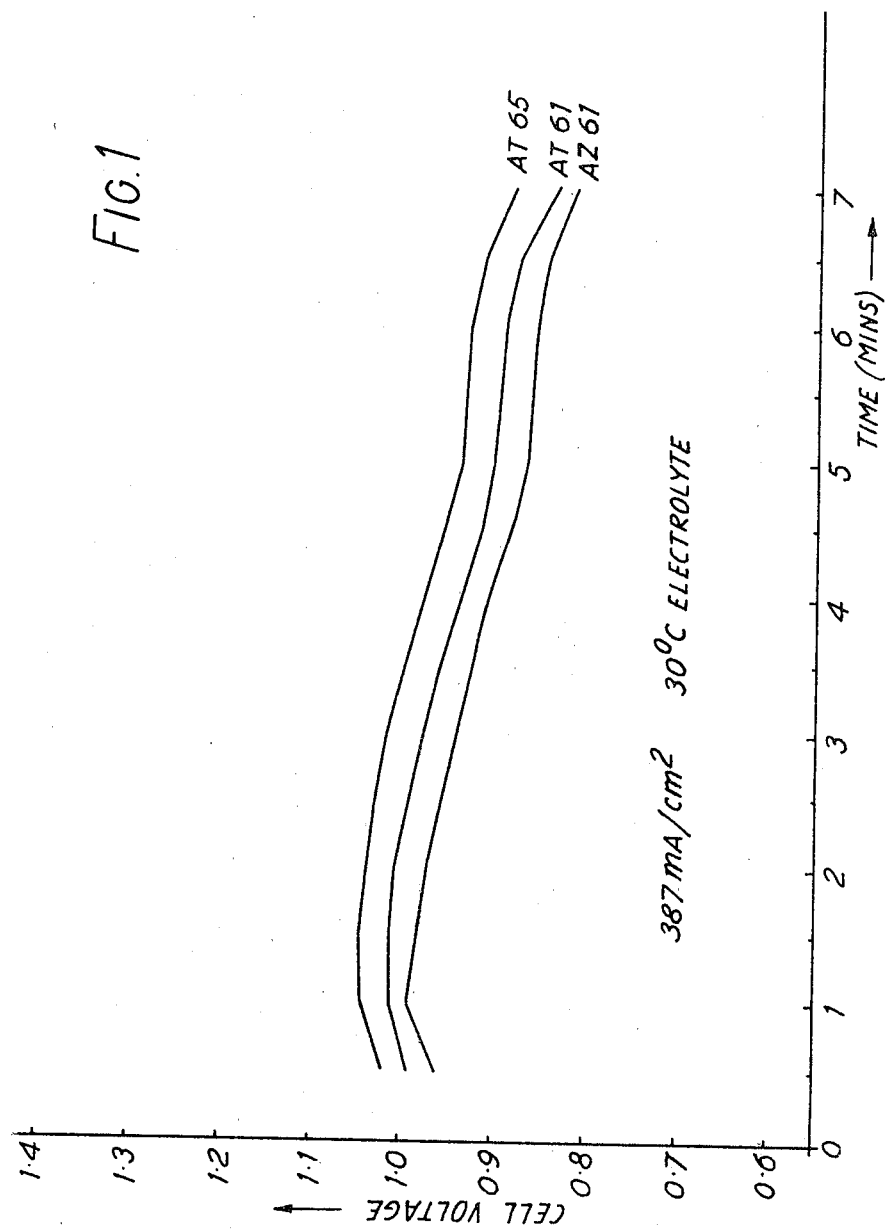
FIG. 1 shows the voltage obtained from a primary cell plotted against time.

The electrochemical performance of alloys AZ61, AT61 and AT65 were compared by forming a single cell from the alloy with a cathode of silver chloride sheet separated from the alloy by glass beads to give an electrolyte gap of 0.056 mm wide. The cell was sandwiched between silver plates which acted as anode and cathode current collectors within an enclosed acrylic case. Artificial seawater of electrical conductivity 0.053 mhos-cm was pumped through the cell at a flow rate of 120 mls/min. The electrical output of the cell was connected to a variable carbon pile rheostat which was adjusted during the test discharge to maintain a constant current density from the cell of 387 mA/cm$^2$. Voltage/time curves were plotted for the three alloys and are shown in FIG. 1. It may be seen that all three alloys gave discharge curves of the same general shape but that AT61 and AT65 alloys gave higher voltage throughout, AT65 being the highest. On dismantling of the cells after testing, all three alloys showed clean metal surfaces, with no indication of "sludging".

EXAMPLE 2

Plates composed of some of the alloys given in Table 1 were used to build batteries having anodes formed by the plates and silver chloride cathodes, separated by glass bead spacers to give a space 0.80 mm wide to allow electrolyte to circulate between the plates. The batteries each comprised 5 cells of this type and the plates were held together in an epoxy resin mounting.

The performance of each battery was assessed by immersing it in a solution of sodium chloride in water, to simulate sea water, and connecting it to an external circuit having resistive loads to produce a constant current density of 5 mA/cm$^2$ with an intermittent pulse load equivalent to 150 mA/cm$^2$ applied for 1 second every 10 seconds for 60-second periods. Three pulse sequences were applied, 3 minutes, 45 minutes and 75 minutes after activation of the battery, (pulses A, B and C respectively). The voltage and current delivered by each battery at the start and end of each trial were measured by standard methods. The voltage was also measured just before each pulse sequence, and the maximum voltage during the first pulse and during the sixth pulse of each sequence was measured. Immediately after discharge the batteries were dismantled and the type and degree of sludging was assessed visually on a scale from A+ (slight sludge) to E— (heavy sludge). The anode plates were then cleaned in chromic acid, washed, dried and weighed to estimate the apparent coulombic efficiency (i.e. the ratio of theoretical anode consumption, derived from the external charge supplied by the anode to the total weight loss of anode material during discharge).

These trials were carried out at ambient pressure and also in a pressure vessel at 60 bars pressure to simulate depth. The test conditions used were as follows:

(a) Pressure 1 bar, salinity 3.6%, temperature 30° C.
(b) Pressure 60 bar, salinity 3.6%, temperature 30°C.

Results of these tests in 3.6% NaCl at 30° C. and 1 bar pressure are shown in Table 2 below.

TABLE 2

| ALLOY | | | AZ61 | AZ61 | AZ61 | AP65 | AP65 | MTA75 | MTA75 | AT61 | AT61 | AT65 | AT65 |
|---|---|---|---|---|---|---|---|---|---|---|---|---|---|
| AgCl THICKNESS (mm) | | | 0.25 | 0.25 | 0.25 | 0.25 | 0.25 | 0.25 | 0.25 | 0.25 | 0.25 | 0.25 | 0.25 |
| ELECTROLYTE GAP (mm) | | | 0.82 | 0.82 | 0.82 | 0.82 | 0.82 | 0.82 | 0.82 | 0.82 | 0.82 | 0.82 | 0.82 |
| RUN DURATION (mins) | | | 90 | 90 | 90 | 90 | 90 | 90 | 90 | 90 | 90 | 100 | 90 |
| VOLTAGE - | Initial | (V) | 7.8 | 7.8 | 7.8 | 8.5 | 8.4 | 9.1 | 9.2 | 8.2 | 8.2 | 7.9 | 8.0 |
|  | Final | (V) | 7.8 | 7.8 | 7.8 | 8.4 | 8.4 | 9.4 | 8.9 | 8.0 | 7.7 | 7.9 | 7.8 |
| CURRENT - | Initial | (mA) | 152 | 152 | 152 | 152 | 150 | 152 | 151 | 152 | 152 | 152 | 152 |
|  | Final | (mA) | 152 | 152 | 149 | 151 | 148 | 154 | 145 | 148 | 144 | 152 | 148 |
| PULSE A | Initial | (V) | 7.8 | 7.7 | 7.8 | 8.5 | 8.4 | 9.1 | 9.2 | 8.2 | 8.2 | 7.9 | 8.0 |
| VOLTAGE - | Pulse 1 | (V) | 4.3 | 5.7 | 4.5 | 4.0 | 3.5 | 5.3 | 5.2 | 5.2 | 4.7 | 5.0 | 5.0 |
|  | Pulse 6 | (V) | 5.1 | 6.0 | 5.3 | 4.8 | 4.0 | 5.9 | 6.0 | 5.5 | 5.2 | 5.6 | 5.6 |
| PULSE B | Initial | (V) | 7.8 | 7.7 | 7.8 | 8.4 | 8.4 | 9.0 | 9.1 | 8.0 | 7.9 | 7.9 | 8.0 |
| VOLTAGE - | Pulse 1 | (V) | 3.3 | 4.3 | 3.0 | 3.8 | 3.6 | 5.4 | 5.8 | 4.4 | 4.4 | 4.8 | 4.7 |
|  | Pulse 6 | (V) | 4.5 | 5.3 | 4.4 | 4.3 | 4.0 | 5.8 | 6.1 | 5.0 | 5.0 | 5.3 | 5.2 |
| PULSE C | Initial | (V) | 7.8 | 7.8 | 7.8 | 8.4 | 8.4 | 9.1 | 9.0 | 8.1 | 8.0 | 7.8 | 7.9 |
| VOLTAGE - | Pulse 1 | (V) | 3.5 | 4.6 | 2.8 | 3.3 | 3.1 | 5.2 | 2.1 | 4.7 | 4.3 | 4.0 | 4.2 |
|  | Pulse 6 | (V) | 4.5 | 5.4 | 3.9 | 3.9 | 3.6 | 5.6 | 2.2 | 5.2 | 4.6 | 4.6 | 4.8 |
| COULOMBIC EFFICIENCY % | | | 32.0 | 25.5 | 34.2 | 18.2 | 18.9 | 9.3 | 9.1 | 13.6 | 18.2 | 24.5 | 24.5 |
| SLUDGE CLASSIFICATION | | | A | A | A | C | C | E | E | A | A | A+ | A+ |

It can be seen from these results that sludging performance of the alloys containing tin were at least as good as AZ61 and better than the other alloys tested. Electrical performance of tin containing alloys was also as good as, or better than other alloys. Thus, while in some instances high voltages were recorded for AP65 and MTA75, these alloys showed severe sludging and very low efficiency. Tin-containing alloys, on the other hand, consistently maintained high voltage level on pulsing even at the end of the tests, where erratic results were obtained from other alloys.

Figure 2:
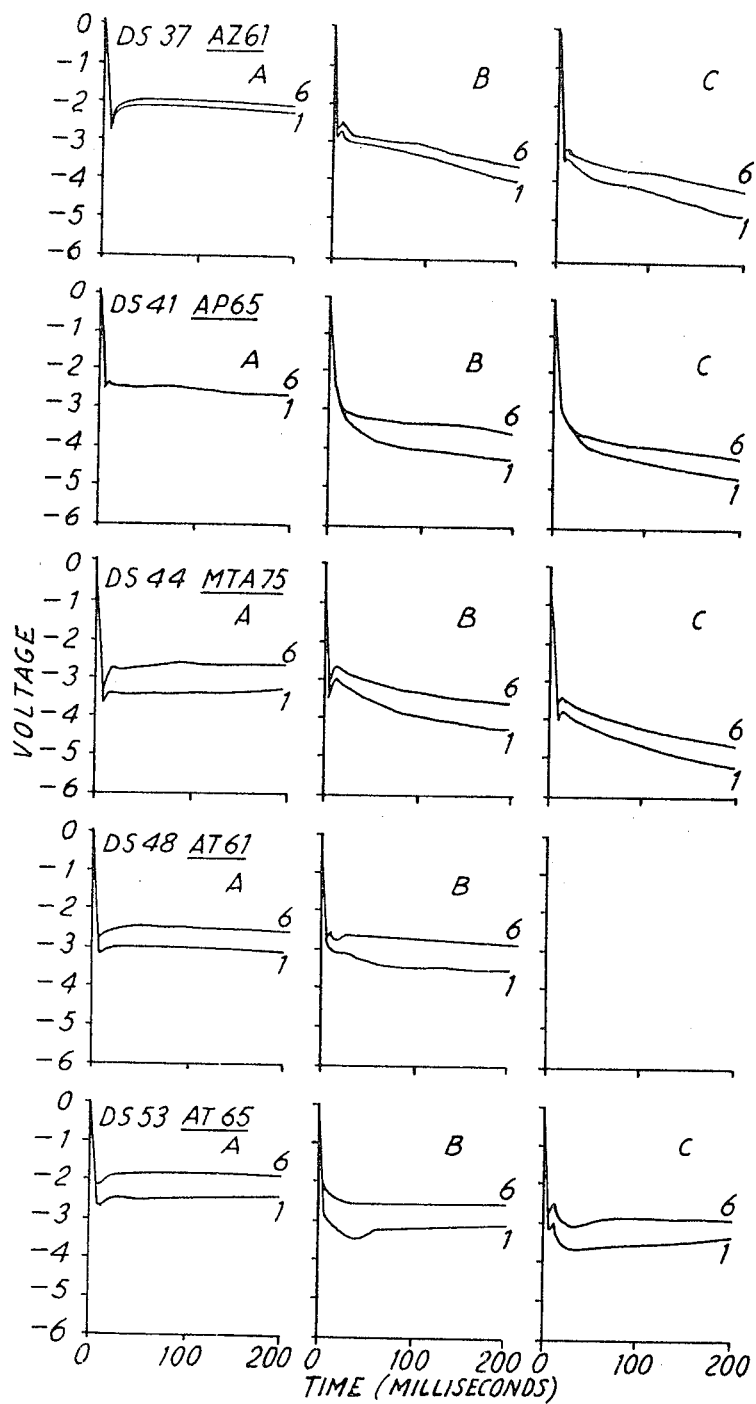
FIG. 2 shows oscilloscope traces of the voltage obtained from a battery plotted against time.

Similar results were obtained when this trial was repeated at a pressure of 60 bars although the degree of sludging obtained was greater for all the alloys. In this instance the benefit of the tin alloys in maintaining a uniform voltage on pulsing is illustrated by the attached FIG. 2, which shows typical oscilloscope traces of voltage during pulsing with reference to the pre-pulse level. Here it may be seen that although initially all the alloys showed similar traces, as the trial proceeded, alloys AZ61, AP65 and MTA75 showed voltage curves falling at an increasing rate, while the two tin-containing alloys showed curves that remained essentially level, even up to 75 minutes.

EXAMPLE 3

The performance of batteries made in the same way as those in Example 2 was assessed by immersing them, as before, in a solution of sodium chloride in water, but connecting the battery to resistive loads which were electronically controlled and timed so that the battery was discharged at a constant current density of 5 mA/cm² for 75 minutes, but with a pulsed load to produce a nominal current density of 150 mA/cm² applied after 30 minutes of discharge for 1 second every 10 seconds, for a total time of 30 minutes. Low load voltage and the pulse voltage at the start of pulsing, after 15 minutes pulsing and after 30 minutes pulsing were recorded. After discharge the battery was stripped down and sludging assessed as in Example 2. Results of test carried out in 3.6 NaCl at 30° C. and 60 bar pressure are shown in Table 3. It will be seen that the tin-containing alloys showed better sludging behaviour and that the pulse voltage of the AT61 alloy, containing 1% of tin was superior to that of the other alloys. Pulse voltage for this alloy also showed the least variation from beginning to end of the pulse discharge (i.e. showed the flattest pulse voltage curve). In Table 3 the "initial" voltage is that immediately before the start of a pulse, "min pulse" is the minimum voltage observed during that pulse and "max.return" is the maximum voltage observed when that pulse has ceased.

FIG. 3 shows the variation of pulse voltage with time during the pulsing stage of the discharge for alloys AZ61 and AT61. It may be seen that although AZ61 achieved a satisfactory pulse voltage in the initial stages, this rapidly decayed to lower values, whilst AT61 maintained a more constant level.

TABLE 3

| ALLOY | AZ61 | AP65 | MTA75 | AT61 | AT65 |
|---|---|---|---|---|---|
| AgCl THICKNESS (mm) | 0.25 | 0.25 | 0.25 | 0.25 | 0.25 |
| ELECTROLYTE GAP (mm) | 0.82 | 0.82 | 0.82 | 0.82 | 0.82 |
| RUN DURATION (Mins) | 75 | 75 | 75 | 75 | 75 |
| VOLTAGE | | | | | |
| Initial (V) | 7.80 | 8.50 | 9.15 | 8.15 | 7.88 |
| Final (V) | 7.73 | 6.85 | 8.28 | 7.78 | 7.00 |
| Current | | | | | |
| Initial (mA) | 151 | 153 | 152 | 152 | 151 |
| Final (mA) | 152 | 123 | 143 | 145 | 131 |
| 1ST PULSE | | | | | |
| Initial (V) | 7.75 | 8.35 | 9.0 | 8.1 | 8.0 |
| Min.Pulse (V) | 3.65 | 4.2 | 5.7 | 5.1 | 5.3 |
| Max.Return (V) | 7.95 | 8.5 | 9.4 | 8.2 | 8.2 |
| 15 MIN.PULSE | | | | | |
| Initial (V) | 8.0 | 8.45 | 9.3 | 8.2 | 7.9 |
| Min.Pulse (V) | 4.7 | 5.1 | 5.3 | 5.7 | 5.1 |
| Max.Return (V) | 8.2 | 8.5 | 9.3 | 8.25 | 8.1 |
| 30 MIN.PULSE | | | | | |
| Initial (V) | 7.95 | 8.1 | 8.8 | 8.05 | 7.65 |
| Min.Pulse (V) | 4.6 | 3.0 | 4.4 | 5.4 | 2.7 |
| Max.Return (V) | 8.2 | 8.1 | 8.8 | 8.05 | 7.6 |
| COULOMBIC EFFICIENCY % | 31.6 | 16.5 | 18.2 | 21.6 | 24.6 |
| SLUDGE CLASSIFICATION* | B | D | E+ | A | B+ |

EXAMPLE 4

Further discharge tests were carried using the same technique as described in Example 3, using additional alloys containing tin, with small additions of Mn or Zn. These were evaluated in comparison with standard AZ61. Results are shown in Table 4, for two different test conditions. Values shown are average for triplicate tests.

TABLE 4

| TEST CONDITIONS | 60 bar/20° C./3.6% NaCl | | | | 20 bar/20° C./3.6% NaCl | | |
|---|---|---|---|---|---|---|---|
| ALLOY | AZ61 | AT61 | ATM61½ | ATZ611 | AZ61 | AT61 | ATZ611 |
| AgCl Thickness (mm) | 0.25 | 0.25 | 0.25 | 0.25 | 0.25 | 0.25 | 0.25 |
| Electrolyte Gap (mm) | 0.82 | 0.82 | 0.82 | 0.82 | 0.82 | 0.82 | 0.82 |
| Run Duration (mins) | 75 | 75 | 75 | 75 | 75 | 75 | 75 |
| Voltage - Initial (V) | 7.79 | 8.08 | 8.00 | 8.13 | 7.79 | 8.07 | 8.08 |
| - Final (V) | 7.79 | 7.78 | 7.81 | 7.80 | 7.78 | 7.79 | 7.48 |
| Current - Initial (mA) | 0.155 | 0.153 | 0.155 | 0.151 | 0.154 | 0.150 | 0.151 |
| - Final (mA) | 0.155 | 0.148 | 0.152 | 0.145 | 0.155 | 0.145 | 0.139 |
| Min.Pulse Voltage (V) | | | | | | | |
| 1st Pulse | 3.49 | 4.87 | 3.60 | 5.26 | 3.72 | 4.85 | 5.45 |
| 15 min.pulse | 5.33 | 5.42 | 4.86 | 5.62 | 5.39 | 5.48 | 5.57 |
| 30 min.pulse | 4.98 | 5.02 | 4.64 | 5.33 | 5.06 | 5.24 | 5.13 |
| Average Pulse Current (A) | 4.45 | 4.32 | 4.41 | 4.29 | 4.38 | 4.42 | 4.24 |
| Coulombic efficiency % | 36.7 | 26.7 | 35.0 | 28.5 | 35.9 | 28.4 | 23.7 |

These results show that alloys AT61 and ATZ611, both containing 1% Sn, give significant improvements in pulse voltage compared to AZ61. Addition of Mn to the tin-containing alloys reduced pulse voltage, but significantly increased coulombic efficiency of the alloy.

EXAMPLE 5

In order to determine the effect of alloy composition on the rate at which the battery achieved an adequate voltage level when pulsing commenced, the number of pulses required until the battery achieved 90% of its maximum pulse voltage was noted under several discharge conditions for battery tests as described in the previous Examples 2-4. Data is shown in Table 5.

TABLE 5

| TEST CONDITIONS | ALLOY | Pulses to achieve 90% of Max.Pulse Voltage |
|---|---|---|
| 1 bar/30° C./3.6% NaCl | AZ61 | 3 |
| | AT6½ | 1 |
| | AT61 | 1 |
| | AT62 | 1 |
| | ATZ611 | 1 |
| 20 bar/20° C./3.6% NaCl | AZ61 | 5 |
| | AT61 | 1 |
| | ATZ611 | 1 |
| 60 bar/20° C./3.6% NaCl | AZ61 | 4 |
| | AT61 | 1 |
| | ATZ611 | 1 |
| 1 bar/0° C./1.5% NaCl | AZ61 | 4 |
| | AT61 | 1 |

TABLE 5-continued

| TEST CONDITIONS | ALLOY | Pulses to achieve 90% of Max.Pulse Voltage |
| --- | --- | --- |
|  | ATZ611 | 2 |
| 20 bar/0° C./1.5% NaCl | AZ61 | 14 |
|  | AT61 | 7 |

In all cases "come-up" time for alloys containing tin was less than that of AZ61.

We claim:

1. An electric primary cell having an anode made of a magnesium alloy containing the following constituents by weight, apart from normal impurities:

| Al | 1-9% |
| --- | --- |
| Zn | 0-4% |
| Sn | 0.1-5% |
| Mn | 0-1% |
| Mg | Remainder. |

2. A cell according to claim 1, said alloy containing the following constituents by weight:

| Al | 4-7% |
| --- | --- |
| Zn | 0-1% |
| Sn | 0.25-3% |
| Mn | 0-0.3%. |

3. A cell according to claim 2, said alloy containing the following constituents by weight:

| Al | 5.5-6.5% |
| --- | --- |
| Zn | 0.5-1.0% |
| Sn | 0.5-1.5%. |

4. A cell according to one of claims 1-3 comprising salt water as the electrolyte.

5. A cell according to claim 4, in which the cathode comprises silver chloride or lead chloride.

6. Electrically powered apparatus for underwater use, comprising a cell according to any one of claims 1 to 3.

7. Apparatus according to claim 6, of a type requiring pulsed electric power.

* * * * *